(12) United States Patent
Li et al.

(10) Patent No.: US 11,582,791 B2
(45) Date of Patent: Feb. 14, 2023

(54) PUCCH COLLISION PROCESSING METHOD AND TERMINAL

(71) Applicant: VIVO MOBILE COMMUNICATION CO., LTD., Chang'an Dongguan (CN)

(72) Inventors: Na Li, Chang'an Dongguan (CN); Xiaodong Shen, Chang'an Dongguan (CN)

(73) Assignee: VIVO MOBILE COMMUNICATIONS CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/137,681

(22) Filed: Dec. 30, 2020

(65) Prior Publication Data

US 2021/0120559 A1 Apr. 22, 2021

Related U.S. Application Data

(63) Continuation of application No. PCT/CN2019/094697, filed on Jul. 4, 2019.

(30) Foreign Application Priority Data

Jul. 4, 2018 (CN) .......................... 201810725412.X

(51) Int. Cl.
*H04W 56/00* (2009.01)
*H04W 72/53* (2023.01)
(Continued)

(52) U.S. Cl.
CPC .......... *H04W 72/53* (2023.01); *H04B 7/0626* (2013.01); *H04W 72/0446* (2013.01);
(Continued)

(58) Field of Classification Search
CPC ......... H04W 72/0493; H04W 72/0513; H04W 72/0446; H04W 72/1242; H04W 72/1263; H04B 7/0626
(Continued)

(56) References Cited

U.S. PATENT DOCUMENTS

| 2012/0201207 A1 | 8/2012 | Liu et al. |
| 2015/0215928 A1 | 7/2015 | Davydov et al. |

(Continued)

FOREIGN PATENT DOCUMENTS

| CN | 102123008 A | 7/2011 |
| CN | 103262604 A | 8/2013 |

(Continued)

OTHER PUBLICATIONS

International Search Report & Written Opinion related to Application No. PCT/CN2019/094697; dated Jan. 14, 2021.
(Continued)

*Primary Examiner* — Sai Ming Chan
(74) *Attorney, Agent, or Firm* — von Briesen & Roper, s.c.

(57) ABSTRACT

A PUCCH collision processing method and a terminal are provided, and the method includes: transmitting, in a case that a first PUCCH and a second PUCCH overlap in a first slot, one of the first PUCCH and the second PUCCH within the first slot according to a configuration of at least one of the first PUCCH and the second PUCCH, wherein, the first PUCCH is configured as multi-slot PUCCH repetition transmission, and a carried content in the first PUCCH includes one of Channel State Information CSI and a Scheduling Request SR, the second PUCCH is configured as single-slot or multi-slot PUCCH repetition transmission, and a carried content in the second PUCCH includes one of CSI and an SR; the first slot is one or more slots.

16 Claims, 2 Drawing Sheets

(51) Int. Cl.
    *H04B 7/06*        (2006.01)
    *H04W 72/0446*   (2023.01)
    *H04W 72/1263*   (2023.01)
    *H04W 72/21*     (2023.01)
    *H04W 72/566*    (2023.01)

(52) U.S. Cl.
    CPC ....... *H04W 72/1263* (2013.01); *H04W 72/21* (2023.01); *H04W 72/569* (2023.01)

(58) Field of Classification Search
    USPC .......................................................... 370/329
    See application file for complete search history.

(56) References Cited

U.S. PATENT DOCUMENTS

| | | |
|---|---|---|
| 2016/0226639 A1 | 8/2016 | Xiong et al. |
| 2017/0245265 A1 | 8/2017 | Hwang et al. |
| 2018/0131431 A1 | 5/2018 | Dinan |
| 2019/0029012 A1 | 1/2019 | Wu et al. |
| 2019/0306922 A1* | 10/2019 | Xiong ................... H04L 1/1664 |
| 2020/0404692 A1* | 12/2020 | Yin ................... H04W 72/1284 |

FOREIGN PATENT DOCUMENTS

| | | |
|---|---|---|
| CN | 104579592 A | 4/2015 |
| EP | 3753287 A1 | 12/2020 |
| JP | 2017534193 A | 11/2017 |
| WO | 2017132810 A1 | 8/2017 |
| WO | 2019160846 A1 | 8/2019 |

OTHER PUBLICATIONS

First Chinese Office Action for related Application No. 201810725412. X; dated Apr. 27, 2021.
Ericsson, "Summary of Overlapped PUCCH Resources", May 21-25, 2018, 3GPP TSG RAN WG1 Meeting#93, Busan, South Korea.
Extended European Search Report for related Application No. 19830349.7; dated Jul. 29, 2021.
Vivo, "Discussion on long PUCCH for eMBB", May 21-25, 2018, 3GPP TSG RAN WG1 Meeting #93, Busan, Korea.
Lenovo, Motorola Mobility, "Remaining issues on UCI multiplexing on PUCCH", May 21-25, 2018, 3GPP TSG RAN WG1 Meeting #93, Busan, Korea.
ETRI, "Remaining issues for PUCCH structure in long-duration", May 21-25, 2018, 3GPP TSG RAN WG1 Meeting 93, Busan, Korea.
R1-1717300, Source: Huawei, HiSilicon, "Details of CSI reporting on PUCCH/PUSCH" Document for: Discussion and Decision, Agenda item: 7.2.2.2, Release: 3GPP TSG RAN WG1 Meeting #90bis, Oct. 9-13, 2017, Prague, Czech Republic.
R1-1808225, Source: vivo, "Remaining issues on PUCCH" Document for: Discussion and Decision, Agenda item: 7.1.3.2, Release: 3GPP TSG RAN WG1 Meeting #94, Aug. 21-25, 2018, Gothenburg, Sweden.
R1-1806837, Source: OPPO, "Discussion on overlapped UL transmissions with URLLC" Document for: Discussion and Decision , Agenda item: 7.1.3.2.3, Release: 3GPP TSG RAN WG1 Meeting #93, May 21-25, 2018, Busan, Korea.
R1-1806620, Source: LG Electronics, "Remaining issues on short-duration PUCCH" Document for: Discussion and decision, Agenda item: 7.1.3.2.1, Release: 3GPP TSG RAN WG1 Meeting #93, May 21-25, 2018, Busan, Korea.
R1-1806060, Source: vivo, "Discussion on short PUCCH for eMBB" Document for: Discussion and Decision, Agenda item: 7.1.3.2.1, Release: 3GPP TSG RAN WG1 Meeting #93, May 21-25, 2018, Busan, Korea.
R1-1801537, Source: vivo, "Remaining issues on UCI multiplexing" Document for: Discussion and Decision, Agenda item: 7.1.3.2.3, Release: 3GPP TSG RAN WG1 Meeting #92, Feb. 26-Mar. 2, 2018, Athens, Greece.
Indian Office Action related to Application No. 202127004058 dated Jan. 18, 2022.
Japanese Reasons for Refusal Office Action related to JP Application No. 2021-500031 dated Mar. 17, 2022.
Japanese Notice of Reasons for Refusal for related Application No. 2021-500031; dated Nov. 2, 2022.
Huawei, Hisilicon, "Review Summary for AI 7.1.3.2 related to PUCCH", Aug. 20-24, 2018, 3GPP TSG RAN WG1Meeting #94, Gothenburg, Sweden, R1-1809802.
South Korean Request for the Submission of an Opinion for related Application No. 10-2021-70034585; dated Dec. 16, 2022.
Vivo, "Remaining issues on long PUCCH", Feb. 26, 2018-Mar. 2, 2018, 3GPP TSG RAN WG1 Meeting #92, Athens, Greece, R1-1801536.

* cited by examiner

PUCCH COLLISION PROCESSING METHOD AND TERMINAL

CROSS-REFERENCE TO RELATED APPLICATION

This application is a continuation application of a PCT Application No. PCT/CN2019/094697 filed on Jul. 4, 2019, which claims a priority to the Chinese patent application No. 201810725412.X filed in China on Jul. 4, 2018, a disclosure of which is incorporated herein by reference in its entirety.

TECHNICAL FIELD

The present disclosure relates to the field of communications technologies, and in particular, relates to a physical uplink control channel (Physical Uplink Control Channel, PUCCH) collision processing method.

BACKGROUND

In new radio (New Radio, NR) systems, PUCCHs having various lengths are introduced, such as a short PUCCH (short PUCCH) and a long PUCCH (long PUCCH), where a length of the short PUCCH is one or two orthogonal frequency division multiplexing (Orthogonal Frequency Division Multiplexing, OFDM) symbols, a length of the long PUCCH is four to fourteen OFDM symbols. In addition, in order to increase coverage, some PUCCHs in an NR system may support multi-slot PUCCH repetition (multi-slot PUCCH repetition) transmission, that is, PUCCH may be repeatedly transmitted in multiple continuous or discontinuous slots (slot). In this way, since the PUCCH is repeatedly transmitted in multiple continuous or discontinuous slots (slot), there is a possibility that the PUCCH may collide with another PUCCH. Here, the collision may refer to a collision of two PUCCHs in a time domain within a slot, that is, the two PUCCHs overlap in time, and may partially or completely overlap in time. It may be seen that PUCCH collision is a problem to be solved urgently.

SUMMARY

An embodiment of the present disclosure provides a PUCCH collision processing method to solve the problem of PUCCH collision.

In a first aspect, an embodiment of the present disclosure provides a PUCCH collision processing method, and the method is performed by a terminal and includes: transmitting, in a case that a first PUCCH and a second PUCCH overlap in a first slot, one of the first PUCCH and the second PUCCH within the first slot according to a configuration of at least one of the first PUCCH and the second PUCCH, wherein, the first PUCCH is configured as multi-slot PUCCH repetition (multi-slot PUCCH repetition) transmission, and carried content in the first PUCCH includes one of channel state information (Channel State Information, CSI) and a scheduling request (Scheduling Request, SR), the second PUCCH is configured as single-slot or multi-slot PUCCH repetition transmission, and carried content in the second PUCCH includes one of CSI and an SR; the first slot is one or more slots.

In a second aspect, an embodiment of the present disclosure provides a terminal, and the terminal includes: a transmission module, used to transmit, in a case that a first PUCCH and a second PUCCH overlap in a first slot, one of the first PUCCH and the second PUCCH within the first slot according to a configuration of at least one of the first PUCCH and the second PUCCH, wherein, the first PUCCH is configured as multi-slot PUCCH repetition transmission, and carried content in the first PUCCH includes one of Channel State Information (CSI) and an SR, the second PUCCH is configured as single-slot or multi-slot PUCCH repetition transmission, and carried content in the second PUCCH includes one of CSI and an SR; the first slot is one or more slots.

In a third aspect, an embodiment of the present disclosure provides a terminal, and the terminal includes: a storage, a processor, and a program stored on the storage and executable by the processor, wherein when the program is executed by the processor, the processor implements steps of the PUCCH collision processing method provided in an embodiment of the present disclosure.

In a fourth aspect, an embodiment of the present disclosure provides a computer readable storage medium, a computer program is stored on the computer readable storage medium, wherein in a case that the computer program is executed by a processor, the processor implements steps of the PUCCH collision processing method provided in an embodiment of the present disclosure.

In an embodiment of the present disclosure, the problem of PUCCH collision may be solved, and effectiveness of communication and performance of the terminal may be improved.

BRIEF DESCRIPTION OF THE DRAWINGS

In order to more clearly illustrate technical solutions in embodiments of the present disclosure, drawings used in description of the embodiments of the present disclosure will be briefly introduced below. Obviously, the drawings in the following description are only some embodiments of the present disclosure. Based on these drawings, other drawings may be obtained by those skilled in the art without any creative work.

DETAILED DESCRIPTION

The technical solutions of embodiments of the present disclosure will be clearly and completely described below with reference to the drawings of embodiments of the present disclosure. Apparently, the described embodiments are some embodiments of the present disclosure, but are not all the embodiments. Based on embodiments of the present disclosure, all other embodiments derived by a person of ordinary skill in the art without any creative efforts shall fall within the scope of the present disclosure.

The terms "comprise" in the specification and the claims of the present application and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent to such processes, methods, products or devices. In addition, the term "and/or" in the specification and claims indicates at least one of objects connected by the term, for example, A and/or B may mean these three cases: A exists alone, B exists alone and A and B exist simultaneously.

In embodiments of the present disclosure, terms such as "exemplary" or "for example" are used to represent examples, illustrations, or explanations. In embodiments of the present disclosure, any embodiment or design solution described as "exemplary" or "for example" should not be construed as being more preferable or advantageous than other embodiments or design solutions. Rather, use of terms such as "illustrative" or "for example" is intended to present concepts in a concrete manner.

Embodiments of the present disclosure will be described below with reference to the drawings. A PUCCH collision processing method and a terminal provided in an embodiment of the present disclosure may be applied to a wireless communication system. The wireless communication system may be a 5G system, or an evolved long term evolution (Evolved Long Term Evolution, eLTE) system, or a subsequent evolved communication system.

Figure 1:
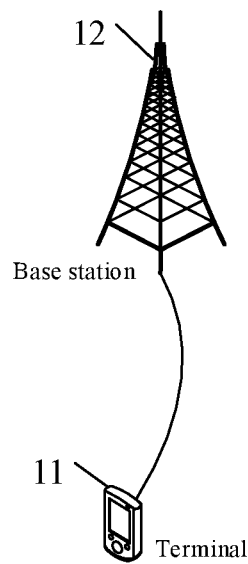
FIG. 1 is an architectural diagram of a network system to which an embodiment of the present disclosure is applicable.

Referring to FIG. 1, FIG. 1 is an architectural diagram of a network system to which an embodiment of the present disclosure is applicable. As shown in FIG. 1, a terminal 11 and a base station 12 are included, wherein the terminal 11 may be a user equipment (User Equipment, UE) or other terminal-side device, such as a mobile phone, a tablet personal computer (Tablet Personal Computer), a laptop computer (Laptop Computer), a personal digital assistant (Personal Digital Assistant, PDA), a mobile Internet device (Mobile Internet Device, MID), or a wearable device (Wearable Device) and other terminal-side devices. It should be noted that a specific type of the terminal 11 is not limited in an embodiment of the present disclosure. The above base station 12 may be a 4G base station, or a 5G base station, or a later version base station, or a base station in other communication systems, or may be called Node B, Evolved Node B, or other words in the field. As long as the same technical effect is achieved, the base station is not limited to a specific technical vocabulary. In addition, the base station 12 may be a master node (Master Node, MN), or a secondary node (Secondary Node, SN). It should be noted that, only a 5G base station is taken as an example, but a specific type of the base station is not limited in an embodiment of the present disclosure.

Figure 2:
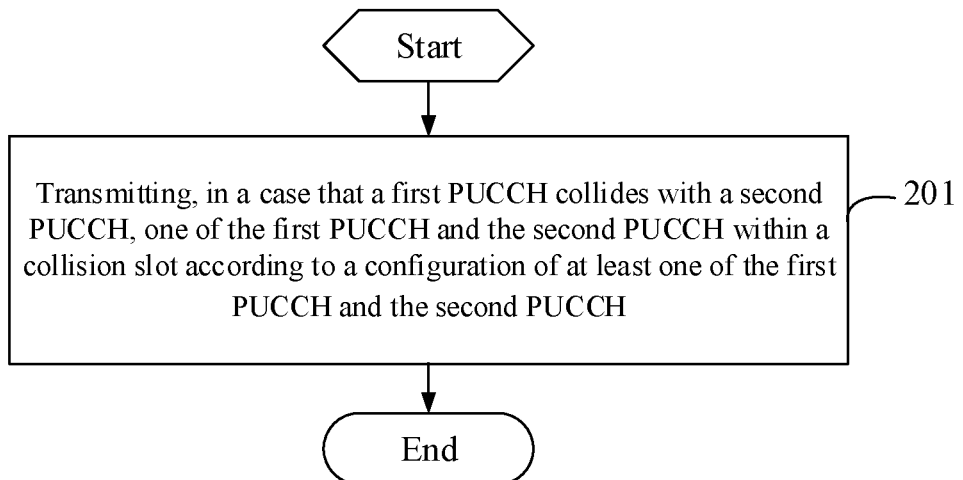
FIG. 2 is a flowchart of a PUCCH collision processing method provided in an embodiment of the present disclosure.

Referring to FIG. 2, FIG. 2 is a flowchart of a PUCCH collision processing method provided in an embodiment of the present disclosure. The method is performed by a terminal, as shown in FIG. 2, the method includes Step 201.

Step 201: transmitting, in a case that a first PUCCH collides with a second PUCCH, one of the first PUCCH and the second PUCCH within a collision slot according to a configuration of at least one of the first PUCCH and the second PUCCH, wherein, the first PUCCH is configured as a multi-slot PUCCH repetition transmission, and a carried content in the first PUCCH includes one of Channel State Information (CSI) and a Scheduling Request (SR), and a carried content in the second PUCCH includes one of CSI and an SR.

It should be noted that, in an embodiment of the present disclosure, timing of the first PUCCH and the second PUCCH is not limited, and the first and the second here are only for distinguishing different PUCCHs.

The first PUCCH may be a long (long) PUCCH, a length of the PUCCH may be 4 to 14 OFDM symbols, and the PUCCH may be PUCCH format (format) 1, or PUCCH format 3 or PUCCH format 4, etc., which is not limited. For example, the first PUCCH may also be a short (short) PUCCH.

In addition, the first PUCCH is configured as multi-slot PUCCH repetition transmission, which may be configured via a higher-layer signaling (i.e. configured via an RRC signaling by a network side). The first PUCCH supports multi-slot PUCCH repetition transmission, that is, the first PUCCH may be repeatedly transmitted in multiple continuous or discontinuous slots, and the number of transmissions may be the number configured by a higher layer. Of course, this is not limited. For example, the first PUCCH is configured as multi-slot PUCCH repetition (multi-slot PUCCH repetition) transmission, which may also be specified by a protocol.

Of course, the second PUCCH may also be a long (long) PUCCH or a short (short) PUCCH, and may be configured as single-slot (single-slot) or multi-slot PUCCH repetition transmission, which is not limited in an embodiment of the present disclosure.

Collision between the first PUCCH and the second PUCCH may be a collision between the first PUCCH and the second PUCCH in a time domain, that is, within a first slot, the first PUCCH and the second PUCCH partially or completely overlap in a time domain, wherein, the first slot includes one or more slots. The first PUCCH may collide with the second PUCCH in one or more slots in a case that the first PUCCH and the second PUCCH are configured as multi-slot PUCCH repetition transmission.

The carried content in the first PUCCH including one of the CSI or the SR may mean that the first PUCCH is used to transmit the CSI or the SR, and the carried content in the second PUCCH is similar to that carried in the first PUCCH. It should be noted that, in a case that the carried content in the first PUCCH includes CSI and the carried content in the second PUCCH includes CSI, the CSI included in the first PUCCH and the CSI included in the second PUCCH may be different.

In addition, transmitting one of the first PUCCH and the second PUCCH within the collision slot according to configuration of at least one of the first PUCCH and the second PUCCH may mean that, a PUCCH to be transmitted within the collision slot is determined according to a configuration of the first PUCCH and a configuration of the second PUCCH, or a PUCCH to be transmitted within the collision slot is determined according to a configuration of the first PUCCH or a configuration of the second PUCCH. However, transmitting one of the first PUCCH and the second PUCCH within the collision slot may mean that, one of the first PUCCH and the second PUCCH is transmitted within the collision slot, while the other one of the first PUCCH and the second PUCCH is discarded or transmission of the other one of the first PUCCH and the second PUCCH is delayed. For example, the first PUCCH is transmitted within the collision slot, while the second PUCCH is discarded or transmission of the second PUCCH is delayed.

Through the above steps, it may be realized that one of the first PUCCH and the second PUCCH is transmitted within the collision slot in a case that the carried content in the first PUCCH includes one of CSI and SR, and the carried content in the second PUCCH includes one of CSI or an SR, and the first PUCCH is configured as multi-slot PUCCH repetition transmission. In this way, since one of the first PUCCH and the second PUCCH is transmitted within the collision slot, the problem of PUCCH collision may be solved, so as to improve effectiveness of communication and performance of the terminal. In addition, an ambiguity problem between a terminal and a base station may also be avoided, since when the above behavior of the terminal is clearly defined, the base station may obtain the above behavior of the terminal, therefore, an ambiguity problem between a terminal and a base station may also be avoided, (for example, behavior of the terminal is specified in the protocol), so as to avoid the ambiguity problem between the terminal and the base station and improve overall performance of the communication system.

In an optional implementation, the configuration includes at least one of: a priority of a carried content, a period of the carried content, a starting time, a format (format) and a transmission mode.

The priority of the carried content may be a priority of the CSI or a priority of the SR, wherein the priority of the CSI or the priority of the SR may be pre-configured, i.e., pre-specified in a protocol, or pre-configured by a base station, etc.

The period of the carried content may be a period of the CSI or a period of the SR. In addition, in an embodiment of the present disclosure, the period of the CSI or the period of the SR may be a length of an absolute period. For example, both the CSI and the SR are configured with a period via an RRC signaling, and lengths of periods of the CSI and the SR are compared. In another way, the period is defined as a long period and a short period. If a period is greater than a certain value, the period is regarded as a long period. If a period is less than the certain value, the period is regarded as a short period.

The starting time may be at least one of a start symbol and a start slot of the PUCCH.

The format may be a format of the PUCCH, such as, format 0, format 1, format 2, or format 4.

The transmission mode may be single-slot transmission or multi-slot transmission, wherein the multi-slot transmission may be multi-slot PUCCH repetition.

In the implementation, it may be realized that a PUCCH to be transmitted within the collision slot is determined according to the configuration of at least one of the first PUCCH and the second PUCCH (at least one of the priority of the carried content, the period of the carried content, the starting time, the format, and the transmission mode), so that the PUCCH to be transmitted may be flexibly determined, to improve performance of the terminal.

It should be noted that, when the configuration includes multiple of the priority of the carried content, the period of the carried content, the starting time, the format and the transmission mode, an order of applying the multiple contents is not limited. For example, when the configuration includes the priority of the carried content and the period of the carried content, a PUCCH to be transmitted in the collision slot may be determined firstly according to the priorities of the carried contents; if the priorities are the same, then a PUCCH to be transmitted in the collision slot may be determined according to the periods of the carried contents; or, a PUCCH to be transmitted in the collision slot may be determined firstly according to the periods of the carried contents, and if the periods of the carried contents are the same, then a PUCCH to be transmitted in the collision slot may be determined according to the priorities of the carried contents.

In an optional implementation, transmission of the other one of the first PUCCH and the second PUCCH is delayed or the other one of the first PUCCH and the second PUCCH is discarded within a collision slot. That is, the other one of the first PUCCH and the second PUCCH is discarded within a collision slot, or transmission of the other one of the first PUCCH and the second PUCCH is delayed.

"the other one" refers to a PUCCH, which is not transmitted within the collision slot, between the first PUCCH and the second PUCCH; discarding the PUCCH may mean that, the PUCCH is discarded within the collision slot and a carried content in the PUCCH is discarded. When the discarded PUCCH is the first PUCCH, for the discarded first PUCCH, supplementary transmission may not be performed after the collision slot, or supplementary transmission for the discarded first PUCCH is performed after the collision slot.

Delaying the transmission of the other one of the first PUCCH and the second PUCCH may mean that, the other one of the first PUCCH and the second PUCCH is transmitted after the collision slot. The number of repetition transmissions is guaranteed due to the supplementary transmission, so that transmission performance of the terminal may be guaranteed.

Discarding the other one of the first PUCCH and the second PUCCH may mean that, the other one of the first PUCCH and the second PUCCH is not transmitted after the collision slot, that is, all transmission of the other one of the first PUCCH and the second PUCCH is discarded.

Optionally, transmitting one of the first PUCCH and the second PUCCH within the collision slot in a case that the configuration includes the priority of the carried content includes: transmitting a PUCCH with a higher priority of a carried content between the first PUCCH and the second PUCCH within the collision slot.

Delaying the transmission of the other one of the first PUCCH and the second PUCCH or discarding the other one of the first PUCCH and the second PUCCH within the collision slot includes: delaying transmission of a PUCCH with a lower priority of a carried content between the first PUCCH and the second PUCCH, or discarding a PUCCH with a lower priority of a carried content between the first PUCCH and the second PUCCH within the collision slot.

In the implementation, it may be realized that a PUCCH with a higher priority is transmitted within the collision slot, and a PUCCH with a lower priority is discarded or transmission of a PUCCH with a lower priority is delayed. The discarding herein may be understood as that the terminal chooses to discard a PUCCH with a lower priority and does not delay transmission of a PUCCH with a lower priority. Of course, in the implementation, in some scenarios, transmission of a PUCCH with a lower priority may also be delayed.

Since a PUCCH with a higher priority is transmitted and a PUCCH with a lower priority is discarded, PUCCH collision may be resolved, thereby improving transmission performance of the terminal.

In addition, in the implementation, a priority of the SR is higher than a priority of the CSI, and/or priorities of the two CSIs are determined according to a predefined priority rule.

The priority rule may be a priority rule specified in a protocol, for example, priorities between CSIs follow (follow) priority rules defined in a protocol.

Of course, in an embodiment of the present disclosure, in some implementations, a priority of CSI may also be defined to be greater than a priority of an SR.

Optionally, transmitting one of the first PUCCH and the second PUCCH within the collision slot in a case that the configuration includes the period of the carried content includes: transmitting a PUCCH with a short period of a carried content between the first PUCCH and the second PUCCH within the collision slot.

Delaying the transmission of the other one of the first PUCCH and the second PUCCH or discarding the other one of the first PUCCH and the second PUCCH within the collision slot includes: delaying transmission of a PUCCH with a long period of a carried content between the first PUCCH and the second PUCCH, or discarding a PUCCH with a long period of a carried content between the first PUCCH and the second PUCCH within the collision slot.

In the implementation, it may be realized that a PUCCH with a short period is transmitted within the collision slot, and a PUCCH with a long period is discarded or transmission of a PUCCH with a long period is delayed. The discarding herein may be understood as that the terminal chooses to discard a PUCCH with a long period and does not delay transmission of a PUCCH with a long period. Of course, in the implementation, in some scenarios, transmission of a PUCCH with a long period may also be delayed.

Since a PUCCH with a short period is transmitted and a PUCCH with a long period is discarded, so that transmission performance of the terminal may be improved.

Optionally, transmitting one of the first PUCCH and the second PUCCH within the collision slot in a case that the configuration includes the starting time includes: transmitting a PUCCH with an earlier starting time between the first PUCCH and the second PUCCH within the collision slot.

Delaying the transmission of the other one of the first PUCCH and the second PUCCH or discarding the other one of the first PUCCH and the second PUCCH within the collision slot includes: delaying transmission of a PUCCH with a later starting time between the first PUCCH and the second PUCCH, or discarding a PUCCH with a later starting time between the first PUCCH and the second PUCCH within the collision slot.

The starting time may include at least one of a position of a start symbol and a position of a start slot.

In the implementation, it may be realized that a PUCCH with an earlier starting time is transmitted within the collision slot, and a PUCCH with a later starting time is discarded or transmission of a PUCCH with a later starting time is delayed. The discarding herein may be understood as that the terminal chooses to discard a PUCCH with a later starting time and does not delay transmission of a PUCCH with a later starting time. Of course, in the implementation, in some scenarios, transmission of a PUCCH with a later starting time may also be delayed.

Since a PUCCH with an earlier starting time is transmitted and a PUCCH with a later starting time is discarded, so that transmission performance of the terminal may be improved.

Optionally, the configuration of at least one of the first PUCCH and the second PUCCH is a configuration of the second PUCCH, and the configuration includes the format. Transmitting one of the first PUCCH and the second PUCCH within a collision slot in a case that a format of the second PUCCH is format 0 or format 2 includes: transmitting the second PUCCH within the collision slot.

Delaying the transmission of the other one of the first PUCCH and the second PUCCH or discarding the other one of the first PUCCH and the second PUCCH within the collision slot includes: delaying transmission of the first PUCCH or discarding the first PUCCH within the collision slot.

In the implementation, it may be realized that the second PUCCH is transmitted, and the first PUCCH is discarded or transmission of the first PUCCH is delayed, in a case that a format of the second PUCCH is format 0 or format 2, so as to ensure that a short PUCCH is transmitted as soon as possible, so as to improve transmission performance of the terminal.

In addition, in the implementation, a PUCCH to be transmitted within the collision slot, and a PUCCH to be discarded or a PUCCH, transmission of which is to be delayed, are determined according to the priorities of the carried contents, the periods of the carried contents, the starting time, or the transmission modes of the first PUCCH and the second PUCCH, in a case that the configuration includes a format, and a format of the second PUCCH is neither format 0 nor format 2. Descriptions related to this example are provided above, which will not be described again herein.

Optionally, the configuration of at least one of the first PUCCH and the second PUCCH is a configuration of the second PUCCH, and the configuration includes the transmission mode. Transmitting one of the first PUCCH and the second PUCCH within a collision slot in a case that a transmission mode of the second PUCCH is single-slot transmission includes: transmitting the second PUCCH within the collision slot.

Delaying the transmission of the other one of the first PUCCH and the second PUCCH or discarding the other one of the first PUCCH and the second PUCCH within the collision slot includes: delaying transmission of the first PUCCH or discarding the first PUCCH within the collision slot.

In the implementation, it may be realized that a PUCCH to be transmitted within the collision slot, and a PUCCH discarded or a PUCCH, transmission of which is to be delayed are determined according to the transmission mode of the second PUCCH.

Since the transmission mode of the second PUCCH is single-slot transmission, the second PUCCH is transmitted within the collision slot, and the transmission of the first PUCCH is delayed or the first PUCCH is discarded, so that transmission performance of the terminal may be guaranteed, since the first PUCCH is configured as multi-slot PUCCH repetition, the first PUCCH may also be guaranteed after the first PUCCH is discarded or transmission of the first PUCCH is delayed.

In addition, a PUCCH to be transmitted within the collision slot, and a PUCCH to be discarded or a PUCCH, transmission of which is to be delayed, are determined according to the priorities of the carried contents, the periods of the carried contents, the starting time, or the formats of the first PUCCH and the second PUCCH, in a case that the transmission mode of the second PUCCH is multi-slot transmission. Descriptions related to this example are provided above, which will not be described again herein.

It should be noted that, all examples in the above implementations are described with respect to cases where the configuration includes the priority of the carried content, the period of the carried content, the starting time, the format and the transmission mode. However, in an embodiment of the present disclosure, a transmission in the above collision slot may also be implemented by way of the following schemes.

If the starting time of the first PUCCH and the starting time of the second PUCCH are the same, a PUCCH with a higher priority may be selected for transmission, and a PUCCH with a lower priority may be discarded or transmission of a PUCCH with a lower priority may be delayed according to the priorities of the carried contents; or, a PUCCH to be transmitted within the collision slot is determined according to the formats or the transmission modes, etc., which is not limited herein.

In addition, in an embodiment of the present disclosure, if the first PUCCH is a multi-slot PUCCH, the carried content includes the CSI; the second PUCCH is a multi-slot PUCCH, and the carried content includes an SR. If the start slots and the number of repetitions of the first and second PUCCH are the same, then the CSI and the SR are processed in a single-slot manner in each slot in which the repetitions occur, that is, the SR is multiplexed in the first PUCCH (or a PUCCH with a carried content including CSI), so that transmission performance of the terminal may be improved.

In addition, if the first PUCCH is a multi-slot PUCCH, the carried content includes CSI 1, and the second PUCCH is a multi-slot PUCCH, and the carried content includes CSI 2, and if the start slot and the number of repetitions of the first PUCCH are the same as the start slot and the number of repetitions of the second PUCCH, respectively, the CSI 1 and the CSI 2 are processed in a single-slot manner in each slot in which the repetitions occur. That is, if a multi-CSI-PUCCH resource is configured, then the CSI 1 and the CSI 2 are multiplexed on the multi-CSI-PUCCH resource for transmission; if a multi-CSI-PUCCH resource is not configured, a PUCCH with a higher CSI priority and the CSI included in the PUCCH may be transmitted according to the priority.

In an embodiment of the present disclosure, through the above-described implementations, the problem of PUCCH collision may be solved, so as to improve effectiveness of communication and performance of the terminal, and avoid an ambiguity problem between the terminal and the base station.

For example, an embodiment of the present disclosure defines behaviors of a terminal (e.g. UE) in a case that a multi-slot PUCCH repetition (e.g., the first PUCCH) used for transmitting CSI/SR collides with another PUCCH (e.g., the second PUCCH) used for transmitting CSI/SR during transmission, thereby avoiding the ambiguity problem between a terminal and a base station.

According to some embodiments of the present disclosure, the terminal transmits a channel carrying a higher uplink control information (Uplink Control Information, UCI) priority, and discards a channel with a lower UCI priority or delays transmission of a channel with a lower UCI priority according to the UCI priorities, in a case that a multi-slot PUCCH repetition used for transmitting CSI/SR collides with another PUCCH used for transmitting CSI/SR during transmission.

For judging priorities, a priority of the SR is higher than a priority of the CSI, the priorities of CSI follow priority rules in related art.

According to some embodiments of the present disclosure, the terminal transmits a channel with a short period, and discards a channel with a long period or delays transmission of a channel with a long period according to periods of UCI, in a case that a multi-slot PUCCH repetition used for transmitting CSI collides with another PUCCH used for transmitting CSI/SR during transmission.

If the UCI is an SR, a period of the UCI refers to a period of the SR, and if the UCI is CSI, a period of the UCI refers to a period of the CSI.

According to some embodiments of the present disclosure, the terminal transmits a channel with an earlier starting time, and discards a channel with a later starting time or delays transmission of a channel with a later starting time according to a chronological order of transmission, in a case that a multi-slot PUCCH repetition used for transmitting CSI/SR collides with another PUCCH used for transmitting CSI/SR during transmission. The starting time herein may be at least one of a position of a start symbol and a start slot number.

According to some embodiments of the present disclosure, the terminal performs transmission according to PUCCH formats in a case that a first multi-slot PUCCH repetition used for transmitting CSI/RS collides with a second PUCCH used for transmitting CSI/SR during transmission.

If a PUCCH format of the second PUCCH used for transmitting CSI/SR is format 0/2, then the terminal delays, in a collision slot, transmission of the first multi-slot PUCCH repetition used for transmitting CSI/RS, and transmits the second PUCCH used for transmitting CSI/SR within the collision slot; or, the terminal discards, in the collision slot, the first multi-slot PUCCH repetition used for transmitting CSI/RS. Otherwise, the terminal discards the second PUCCH used for transmitting CSI/SR, transmits the first multi-slot PUCCH repetition used for transmitting CSI/RS.

According to some embodiments of the present disclosure, the terminal performs transmission according to whether another PUCCH used for transmitting CSI/SR is multi-slot in a case that a multi-slot PUCCH repetition used for transmitting CSI/CSI collides with the another PUCCH used for transmitting CSI/SR during transmission.

If the another PUCCH used for transmitting CSI/SR is single-slot, the terminal delays transmission of the multi-slot PUCCH repetition used for transmitting CSI/RS, and transmits the another PUCCH used for transmitting CSI/SR within the collision slot; if the another PUCCH used for transmitting CSI/SR is single-slot, the terminal discards the multi-slot PUCCH repetition used for transmitting CSI/RS, and transmits the another PUCCH used for transmitting CSI/SR within the collision slot; otherwise, the terminal discards another PUCCH used for transmitting CSI/SR, transmits the multi-slot PUCCH repetition used for transmitting CSI/RS.

In an embodiment of the present disclosure, a transmission behavior of the terminal is standardized in a case that configured multi-slot PUCCH transmission collides with configured PUCCH transmission.

Figure 3:
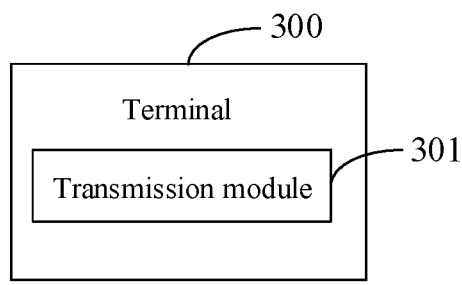
FIG. 3 is a structural diagram of a terminal provided in an embodiment of the present disclosure.

Referring to FIG. 3, FIG. 3 is a structural diagram of a terminal provided in an embodiment of the present disclosure. As shown in FIG. 3, the terminal 300 includes: a transmission module 301, used to transmit, in a case that a first PUCCH collides with a second PUCCH, one of the first PUCCH and the second PUCCH within a collision slot according to a configuration of at least one of the first PUCCH and the second PUCCH, wherein, the first PUCCH is configured as multi-slot PUCCH repetition transmission, and a carried content in the first PUCCH includes one of Channel State Information (CSI) and a Scheduling Request (SR), and a carried content in the second PUCCH includes one of CSI and an SR.

Optionally, the configuration includes at least one of: a priority of a carried content, a period of the carried content, a starting time, a format and a transmission mode.

Optionally, transmission of the other one of the first PUCCH and the second PUCCH is delayed or the other one of the first PUCCH and the second PUCCH is discarded within a collision slot.

Optionally, transmitting one of the first PUCCH and the second PUCCH within the collision slot in a case that the configuration includes the priority of the carried content includes: transmitting a PUCCH with a higher priority of a carried content between the first PUCCH and the second PUCCH within the collision slot.

Delaying the transmission of the other one of the first PUCCH and the second PUCCH or discarding the other one of the first PUCCH and the second PUCCH within the collision slot includes: delaying transmission of a PUCCH with a lower priority of a carried content between the first PUCCH and the second PUCCH, or discarding a PUCCH with a lower priority of a carried content between the first PUCCH and the second PUCCH within the collision slot.

Optionally, a priority of the SR is higher than a priority of the CSI, and/or priorities of two CSIs are determined according to a predefined priority rule.

Optionally, transmitting one of the first PUCCH and the second PUCCH within the collision slot in a case that the configuration includes the period of the carried content includes: transmitting a PUCCH with a short period of a carried content between the first PUCCH and the second PUCCH within the collision slot.

Delaying the transmission of the other one of the first PUCCH and the second PUCCH or discarding the other one of the first PUCCH and the second PUCCH within the collision slot includes: delaying transmission of a PUCCH with a long period of a carried content between the first PUCCH and the second PUCCH, or discarding a PUCCH with a long period of a carried content between the first PUCCH and the second PUCCH within the collision slot.

Optionally, transmitting one of the first PUCCH and the second PUCCH within the collision slot in a case that the configuration includes the starting time includes: transmitting a PUCCH with an earlier starting time between the first PUCCH and the second PUCCH within the collision slot.

Delaying the transmission of the other one of the first PUCCH and the second PUCCH or discarding the other one of the first PUCCH and the second PUCCH within the collision slot includes: delaying transmission of a PUCCH with a later starting time between the first PUCCH and the second PUCCH, or discarding a PUCCH with a later starting time between the first PUCCH and the second PUCCH within the collision slot.

Optionally, the starting time includes at least one of a position of a start symbol and a position of a start slot.

Optionally, the configuration of at least one of the first PUCCH and the second PUCCH is a configuration of the second PUCCH, and the configuration includes the format. Transmitting one of the first PUCCH and the second PUCCH within a collision slot in a case that a format of the second PUCCH is format 0 or format 2 includes: transmitting the second PUCCH within the collision slot.

Delaying the transmission of the other one of the first PUCCH and the second PUCCH or discarding the other one of the first PUCCH and the second PUCCH within the collision slot includes: delaying transmission of the first PUCCH or discarding the first PUCCH within the collision slot.

Optionally, the configuration of at least one of the first PUCCH and the second PUCCH is a configuration of the second PUCCH, and the configuration includes the transmission mode. Transmitting one of the first PUCCH and the second PUCCH within a collision slot in a case that a transmission mode of the second PUCCH is single-slot transmission includes: transmitting the second PUCCH within the collision slot.

Delaying the transmission of the other one of the first PUCCH and the second PUCCH or discarding the other one of the first PUCCH and the second PUCCH within the collision slot includes: delaying transmission of the first PUCCH or discarding the first PUCCH within the collision slot.

The terminal provided in an embodiment of the present disclosure is able to implement various processes implemented by the terminal in the method embodiment of FIG. 2, which will not be repeated herein to avoid repetition, and effectiveness of communication and terminal performance may be improved.

Figure 4:
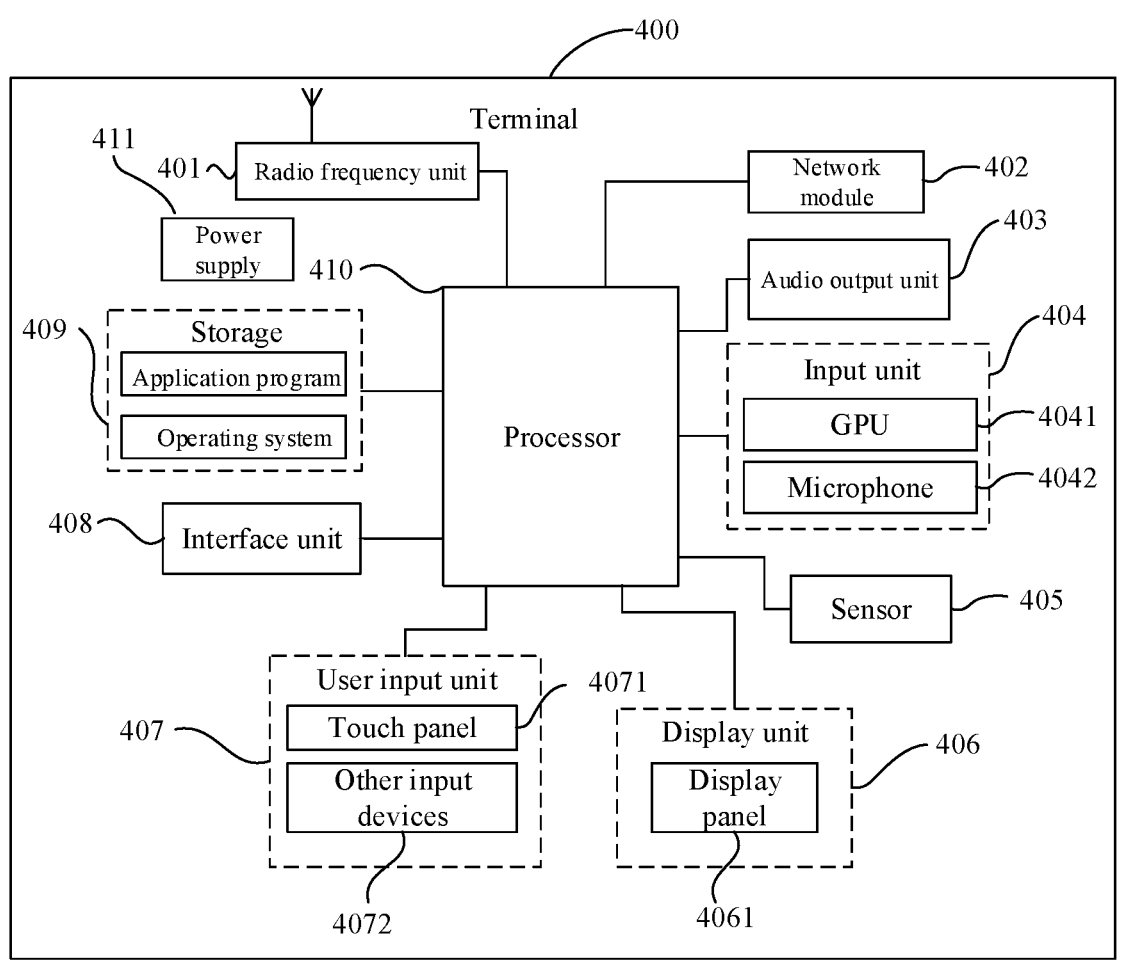
FIG. 4 is another structural diagram of a terminal provided in an embodiment of the present disclosure.

FIG. 4 is a schematic structural diagram of hardware of a terminal according to various embodiments of the present disclosure.

A terminal 400 includes, but is not limited to, a radio frequency unit 401, a network module 402, and an audio output unit 403, an input unit 404, a sensor 405, a display unit 406, a user input unit 407, an interface unit 408, a storage 409, a processor 410, and a power supply 411 and other components. Those skilled in the art may understand that the structure of the terminal shown in FIG. 4 does not constitute a limitation on the terminal, and the terminal may include more or fewer components than those shown in the figure, or some combined components, or different arrangements of components. In an embodiment of the present disclosure, the terminal includes, but is not limited to, a mobile phone, a tablet computer, a notebook computer, a palmtop computer, a car terminal, a wearable device, a pedometer, and the like.

The radio frequency unit 401 is used to transmit, in a case that a first PUCCH collides with a second PUCCH, one of the first PUCCH and the second PUCCH within a collision slot according to a configuration of at least one of the first PUCCH and the second PUCCH, wherein, the first PUCCH is configured as multi-slot PUCCH repetition transmission, and a carried content in the first PUCCH includes one of Channel State Information (CSI) and a Scheduling Request (SR), and a carried content in the second PUCCH includes one of CSI and an SR.

Optionally, the configuration includes at least one of: a priority of a carried content, a period of the carried content, a starting time, a format and a transmission mode.

Optionally, transmission of the other one of the first PUCCH and the second PUCCH is delayed or the other one of the first PUCCH and the second PUCCH is discarded within a collision slot.

Optionally, transmitting one of the first PUCCH and the second PUCCH within the collision slot in a case that the configuration includes the priority of the carried content includes: transmitting a PUCCH with a higher priority of a carried content between the first PUCCH and the second PUCCH within the collision slot.

Delaying the transmission of the other one of the first PUCCH and the second PUCCH or discarding the other one of the first PUCCH and the second PUCCH within the collision slot includes: delaying transmission of a PUCCH with a lower priority of a carried content between the first PUCCH and the second PUCCH, or discarding a PUCCH with a lower priority of a carried content between the first PUCCH and the second PUCCH within the collision slot.

Optionally, a priority of the SR is higher than a priority of the CSI, and/or priorities of the two CSIs are determined according to a predefined priority rule.

Optionally, transmitting one of the first PUCCH and the second PUCCH within the collision slot in a case that the configuration includes the period of the carried content includes: transmitting a PUCCH with a short period of a carried content between the first PUCCH and the second PUCCH within the collision slot.

Delaying the transmission of the other one of the first PUCCH and the second PUCCH or discarding the other one of the first PUCCH and the second PUCCH within the collision slot includes: delaying transmission of a PUCCH with a long period of a carried content between the first PUCCH and the second PUCCH, or discarding a PUCCH with a long period of a carried content between the first PUCCH and the second PUCCH within the collision slot.

Optionally, transmitting one of the first PUCCH and the second PUCCH within the collision slot in a case that the configuration includes the starting time includes: transmitting a PUCCH with an earlier starting time between the first PUCCH and the second PUCCH within the collision slot.

Delaying the transmission of the other one of the first PUCCH and the second PUCCH or discarding the other one of the first PUCCH and the second PUCCH within the collision slot includes: delaying transmission of a PUCCH with a later starting time between the first PUCCH and the second PUCCH, or discarding a PUCCH with a later starting time between the first PUCCH and the second PUCCH within the collision slot.

Optionally, the starting time includes at least one of a position of a start symbol and a position of a start slot.

Optionally, the configuration of at least one of the first PUCCH and the second PUCCH is a configuration of the second PUCCH, and the configuration includes the format. Transmitting one of the first PUCCH and the second PUCCH within a collision slot in a case that a format of the second PUCCH is format 0 or format 2 includes: transmitting the second PUCCH within the collision slot.

Delaying the transmission of the other one of the first PUCCH and the second PUCCH or discarding the other one of the first PUCCH and the second PUCCH within the collision slot includes: delaying transmission of the first PUCCH or discarding the first PUCCH within the collision slot.

Optionally, the configuration of at least one of the first PUCCH and the second PUCCH is a configuration of the second PUCCH, and the configuration includes the transmission mode. Transmitting one of the first PUCCH and the second PUCCH within a collision slot in a case that a transmission mode of the second PUCCH is single-slot transmission includes: transmitting the second PUCCH within the collision slot.

Delaying the transmission of the other one of the first PUCCH and the second PUCCH or discarding the other one of the first PUCCH and the second PUCCH within the collision slot includes: delaying transmission of the first PUCCH or discarding the first PUCCH within the collision slot.

The terminal may improve effectiveness of communication and performance of the terminal.

It should be understood that, in an embodiment of the present disclosure, the radio frequency unit 401 may be used to receive and send information or send and receive signals during a call. Specifically, downlink data from a base station is received and processed by the processor 410; in addition, uplink data is sent to the base station. Generally, the radio frequency unit 401 includes, but is not limited to, an antenna, at least one amplifier, a transceiver, a coupler, a low-noise amplifier, a duplexer, and the like. In addition, the radio frequency unit 401 may also communicate with a network and other devices through a wireless communication system.

The terminal provides users with wireless broadband Internet access through the network module 402, such as helping users to send and receive email, to browse web pages, and to access streaming media, etc.

The audio output unit 403 may convert audio data received by the radio frequency unit 401 or the network module 402 or stored in the storage 409 into audio signals and output them as sound. Moreover, the audio output unit 403 may also provide audio output (for example, a call signal reception sound, a message reception sound, etc.) related to a specific function performed by the terminal 400. The audio output unit 403 includes a speaker, a buzzer, a receiver, and the like.

The input unit 404 is used to receive audio signals or video signals. The input unit 404 may include a graphics processing unit (Graphics Processing Unit, GPU) 4041 and a microphone 4042, and the graphics processing unit 4041 processes image data of a still picture or video obtained by an image capture device (such as a camera) in a video capture mode or an image capture mode. The processed image frames may be displayed on the display unit 406. The image frames processed by the graphics processing unit 4041 may be stored in the storage 409 (or other storage medium) or transmitted via the radio frequency unit 401 or the network module 402. The microphone 4042 may receive sound, and may process such sound into audio data. The processed audio data may be converted into a formatted output that may be transmitted to a mobile communication base station via the radio frequency unit 401 in the case of a telephone call mode.

The terminal 400 further includes at least one sensor 405, such as a light sensor, a motion sensor, and other sensors. Specifically, the light sensor includes an ambient light sensor and a proximity sensor, wherein the ambient light sensor may adjust brightness of a display panel 4061 according to brightness of the ambient light, and the proximity sensor may turn off the display panel 4061 and/or backlight in a case that the terminal 400 is moved to an ear. As a type of the motion sensor, an accelerometer sensor may detect a magnitude of acceleration in various directions (usually three axes), and detect a magnitude and direction of gravity in the case of stationary, and be used to identify attitude of the terminal (such as horizontal and vertical screen switching, related games, magnetometer attitude calibration), vibration recognition related functions (such as pedometer, tap), etc.; the sensor 405 may also include a fingerprint sensor, a pressure sensor, an iris sensor, a molecular sensor, a gyroscope, a barometer, a hygrometer, a thermometer, an infrared sensor and the like, which are not repeated here.

The display unit 406 may be used to display information inputted by the user or information provided to the user. The display unit 406 may include the display panel 4061, and the display panel 4061 may be configured as a form of a liquid crystal display (Liquid Crystal Display, LCD), an organic light-emitting diode (Organic Light-Emitting Diode, OLED) or the like.

The user input unit 407 may be used to receive numeric information or character information inputted by a user and generate a signal input related to the user's settings and related to a function control of the terminal. Specifically, the user input unit 407 includes a touch panel 4071 and other input devices 4072. The touch panel 4071, also referred to as a touch screen, may collect the user's touch operations thereon or nearby (such as the user's operation on the touch panel 4071 or near the touch panel 4071 using any suitable object or accessory such as a finger or a stylus). The touch panel 4071 may include two parts, namely a touch detection device and a touch controller. The touch detection device detects a touch orientation of the user, and detects a signal generated by a touch operation, and transmits the signal to the touch controller; the touch controller receives touch information from the touch detection device, converts the touch information into a coordinate of a touch point, transmits the coordinate to the processor 410, and may receive and execute a command from the processor 410. In addition, the touch panel 4071 may be implemented in various types such as resistive, capacitive, infrared, and surface acoustic waves, etc. In addition to the touch panel 4071, the user input unit 407 may further include other input devices 4072. Specifically, the other input devices 4072 may include, but are not limited to, a physical keyboard, a function button (such as a volume control button, a switch button, etc.), a trackball, a mouse, and a joystick, and details thereof are not described herein again.

Further, the touch panel 4071 may cover the display panel 4061, in a case that the touch screen 4071 detects a touch operation thereon or nearby, the touch operation is transmitted to the processor 410 to determine the type of a touch event, then the processor 410 provides a corresponding visual output on the display screen 4061 based on the type of the touch event. Although in FIG. 4, the touch panel 4071 and the display panel 4061 are implemented as two independent components to implement input and output functions of the terminal, in some embodiments, the touch panel 4071 and the display panel 4061 may be integrated to implement input and output functions of the terminal, which are not limited here.

The interface unit 408 is an interface through which an external device is connected to the terminal 400. For example, the external device may include a wired or wireless headset port, an external power supply (or battery charger) port, a wired or wireless data port, a storage card port, a port for connecting a device with an identification module, and an audio input/output (I/O) port, a video I/O port, or a headphone port, etc. The interface unit 408 may be used to receive input (e.g., data information, power, etc.) from the external device and transmit the received input to one or more elements within the terminal 400 or may be used to transmit data between the terminal 400 and the external device.

The storage 409 may be used to store software programs and various data. The storage 409 may mainly include a storage program area and a storage data area, wherein the storage program area may store an operating system, an application program (such as a sound playback function, an image playback function, etc.) required for at least one function, and the like; the storage data area may store data (such as audio data, a phone book, etc.) created based on the use of a mobile phone and the like. In addition, the storage 409 may include a high-speed random access storage, and may further include a non-volatile storage, such as at least one magnetic disk storage device, a flash memory device, or other volatile solid-state storage device.

The processor 410 is a control center of the terminal, and uses various interfaces and lines to connect various parts of the entire terminal. By running or executing software programs and/or modules stored in the storage 409 and calling data stored in the storage 409, various functions of the terminal and processing data are performed, so that the overall monitoring of the terminal is performed. The processor 410 may include one or more processing units; optionally, the processor 410 may integrate an application processor and a modem processor, wherein the application processor mainly processes an operating system, a user interface, and an application program, etc. The modem processor mainly handles wireless communication. It could be understood that the modem processor may not be integrated into the processor 410.

The terminal 400 may further include a power supply 411 (such as a battery) for supplying power to various components. Optionally, the power supply 411 may be logically connected to the processor 410 through a power management system, so as to implement functions such as charging management, discharging management, and power consumption management through the power management system.

In addition, the terminal 400 includes some functional modules that are not shown, and details are not described herein again.

Optionally, an embodiment of the present disclosure further provides a terminal, and the terminal includes: a processor 410, a storage 409, and a computer program stored on the storage 409 and executable by the processor 410, when the computer program is executed by the processor 410, the processor 410 implements various processes in embodiments of the PUCCH collision processing method, and the same technical effect may be achieved, which will not be repeated herein to avoid repetition.

An embodiment of the present disclosure also provides a computer readable storage medium, a computer program is stored on the computer readable storage medium, and when the computer program is executed by a processor, the processor implements various processes in the embodiments of the PUCCH collision processing method provided in embodiments of the present disclosure, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

It should be noted that, in this article, the terms "including" or "having" or any other variations thereof are intended to encompass a non-exclusive inclusion, such that a process, method, article, or device that includes a plurality of elements includes not only those elements but also other elements not explicitly listed, or elements that are inherent to such a process, method, article, or device. An element defined by the phrase "comprising a . . . " does not exclude the presence of additional identical elements in the process, method, article, or device that includes the element, without further limitation.

Through the description of the foregoing embodiments, it is clear to those skilled in the art that the foregoing method embodiments may be implemented by software plus a necessary general hardware platform, and certainly may also be implemented by hardware, but in many cases, the former is a better implementation. Based upon such understanding, the technical solutions of the present disclosure essentially or a part thereof contributing to the prior art may be embodied in the form of a computer software product which may be stored in a storage medium (e.g., a ROM/RAM, a magnetic disk or an optical disk) and which includes several instructions to cause a terminal (which may be a mobile phone, a personal computer, a server, an air-conditioner or a network device, etc.) to perform the methods described in the various embodiment of the present disclosure.

The embodiments of the present disclosure are described above with reference to the accompanying drawings, but the present disclosure is not limited to the above-mentioned specific embodiments, and the above-mentioned specific embodiments are only illustrative and not restrictive. A person of ordinary skill in the art with hints of the present disclosure may also make many forms that fall within the protection of the present disclosure without departing from the scope protected by the spirit and claims of the present disclosure.

What is claimed is:

1. A Physical Uplink Control Channel (PUCCH) collision processing method, performed by a terminal, comprising:
transmitting, in a case that a first PUCCH and a second PUCCH overlap in one or more collision slots, one of the first PUCCH and the second PUCCH within the one or more slots according to a configuration of at least one of the first PUCCH and the second PUCCH, wherein, the first PUCCH is configured as multi-slot PUCCH repetition transmission, and a carried content in the first PUCCH comprises one of Channel State Information (CSI) and a Scheduling Request (SR), the second PUCCH is configured as single-slot or multi-slot PUCCH repetition transmission, and a carried content in the second PUCCH comprises one of CSI and an SR; and
delaying transmission of the other one of the first PUCCH and the second PUCCH or discarding the other one of the first PUCCH and the second PUCCH within the one or more collision slots, wherein, the configuration comprises a starting time, the starting time comprises a position of a start slot,
wherein, transmitting the one of the first PUCCH and the second PUCCH within the collision slot comprises:
transmitting, in a case that priorities of the carried contents of the first PUCCH and the second PUCCH are same, PUCCH with an earlier starting time between the first PUCCH and the second PUCCH within the collision slot;
delaying the transmission of the other one of the first PUCCH and the second PUCCH or discarding the other one of the first PUCCH and the second PUCCH within the one or more collision slots comprises:
delaying transmission of a PUCCH with a later starting time between the first PUCCH and the second PUCCH, or discarding a PUCCH with a later starting time between the first PUCCH and the second PUCCH within the one or more collision slots, in a case that the priorities of the carried contents of the first PUCCH and the second PUCCH are the same.

2. The method according to claim 1, wherein, the configuration further comprises at least one of:
a priority of the carried content, a period of the carried content, a format and a transmission mode.

3. The method according to claim 2, wherein, in a case that the configuration comprises the priority of the carried content,
transmitting one of the first PUCCH and the second PUCCH within the one or more collision slots comprises:
transmitting, in a case that priorities of carried contents of the first PUCCH and the second PUCCH are different, a PUCCH with a higher priority of a carried content between the first PUCCH and the second PUCCH within the one or more collision slots;
delaying the transmission of the other one of the first PUCCH and the second PUCCH or discarding the other one of the first PUCCH and the second PUCCH within the one or more collision slots comprises:
delaying transmission of a PUCCH with a lower priority of the carried content between the first PUCCH and the second PUCCH, or discarding a PUCCH with a lower priority of the carried content between the first PUCCH and the second PUCCH within the one or more collision slots, in a case that priorities of the carried contents of the first PUCCH and the second PUCCH are different.

4. The method according to claim 3, wherein, a priority of the SR is higher than a priority of the CSI, and/or priorities of two CSIs are determined according to a predefined priority rule.

5. The method according to claim 2, wherein, in a case that the configuration comprises the period of the carried content,
transmitting one of the first PUCCH and the second PUCCH within the one or more collision slots comprises:
transmitting a PUCCH with a short period of the carried content between the first PUCCH and the second PUCCH within the one or more collision slots;
delaying the transmission of the other one of the first PUCCH and the second PUCCH or discarding the other one of the first PUCCH and the second PUCCH within the one or more collision slots comprises:
delaying transmission of a PUCCH with a long period of the carried content between the first PUCCH and the second PUCCH, or discarding a PUCCH with a long period of the carried content between the first PUCCH and the second PUCCH within the one or more collision slots.

6. The method according to claim 1, wherein, the starting time further comprises a position of a start symbol.

7. The method according to claim 2, wherein, the configuration of at least one of the first PUCCH and the second PUCCH is a configuration of the second PUCCH, and the configuration comprises the format;
in a case that the format of the second PUCCH is format 0 or format 2, transmitting one of the first PUCCH and the second PUCCH within the collision slot comprises:
transmitting the second PUCCH within the one or more collision slots;
delaying the transmission of the other one of the first PUCCH and the second PUCCH or discarding the other one of the first PUCCH and the second PUCCH within the one or more collision slots comprises:
delaying transmission of the first PUCCH or discarding the first PUCCH within the one or more collision slots.

8. The method according to claim 2, wherein, the configuration of at least one of the first PUCCH and the second PUCCH is a configuration of the second PUCCH, and the configuration comprises the transmission mode;
in a case that the transmission mode of the second PUCCH is single-slot transmission, transmitting one of the first PUCCH and the second PUCCH within the one or more collision slots comprises:
transmitting the second PUCCH within the one or more collision slots;
delaying the transmission of the other one of the first PUCCH and the second PUCCH or discarding the other one of the first PUCCH and the second PUCCH within the one or more collision slots comprises:
delaying transmission of the first PUCCH or discarding the first PUCCH within the one or more collision slots.

9. A terminal, comprising:
a storage, a processor and a program stored on the storage and executable by the processor, wherein, in a case that the program is executed by the processor, the processor implements a PUCCH collision processing method, the method comprises:

transmitting, in a case that a first PUCCH and a second PUCCH overlap in one or more collision slots, one of the first PUCCH and the second PUCCH within the one or more collision slots according to a configuration at least one of the first PUCCH and the second PUCCH, wherein, the first PUCCH is configured as multi-slot PUCCH repetition transmission, and a carried content in the first PUCCH comprises one of Channel State Information (CSI) and a Scheduling Request (SR), the second PUCCH is configured as single-slot or multi-slot PUCCH repetition transmission, and a carried content in the second PUCCH comprises one of CSI and an SR; and delaying transmission of the other one of the first PUCCH and the second PUCCH or discarding the other one of the first PUCCH and the second PUCCH within the one or more collision slots, wherein, the configuration comprises a starting time, the starting time comprises a position of the start slot, wherein, transmitting the one of the first PUCCH and the second PUCCH within the collision slot comprises:
  transmitting, in a case that priorities of the carried contents of the first PUCCH and the second PUCCH are same, a PUCCH with an earlier starting time between the first PUCCH and the second PUCCH within the collision slot;

delaying the transmission of the other one of the first PUCCH and the second PUCCH or discarding the other one of the first PUCCH and the second PUCCH within the one or more collision slots comprises:
  delaying transmission of the PUCCH with a later starting time between the first PUCCH and the second PUCCH, or discarding a PUCCH with a later starting time between the first PUCCH and the second PUCCH within the one or more collision slots, in a case that the priorities of the carried contents of the first PUCCH and the second PUCCH are the same.

10. The terminal according to claim 9, wherein, the configuration comprises at least one of:
  a priority of the carried content, a period of the carried content, a format and a transmission mode.

11. The terminal according to claim 9, wherein, in a case that the configuration comprises the priority of the carried content,
  transmitting one of the first PUCCH and the second PUICCH within the one or more collision slots comprises:
    transmitting, in a case that priorities of carried contents of the first PUCCCH and the second PUCCH are different, a PUCCH with a higher priory of a carried content between the first PUICCH and the second PUICCH within the one or mere collision slots;
  delaying the transmission of the other one of the first PUCCH and the second PUCCH or discarding the other one of the first PUCCH and the second PUCCH within the one or more collision slots comprises:
    delaying transmission of a PUCCH with a lower priority of the carried content! Between the first PUCCH and the second PUCCH, or discarding a PUCCH with a lower priority of the carried content between the first PUCCH and the second PUCCH within the one or more collision slots, in a case that priorities of the carried contents of the first PUCCH and the second PUCCH are different.

12. The terminal according to claim 11, wherein, a priority of the SR is higher than a priority of the CSI, and/or priorities of two CSIs are determined according to a predefined priority rule.

13. The terminal according to claim 10, wherein, in a case that the configuration comprises the period of the carried content,
  transmitting one of the first PUCCH and the second PUCCH within the one or more collision slots comprises:
    transmitting a PUCCH with a short period of the carried content between the first PUCCH and the second PUCCH within the one or more collision slots;
  delaying the transmission of the other one of the first PUCCH and the second PUCCH or discarding the other one of the first PUCCH and the second PUCCH within the one or more collision slots comprises:
    delaying transmission of a PUCCH with a long period of the carried content between the first PUCCH and the second PUCCH, or discarding a PUCCH with a long period of the carried content between the first PUCCH and the second PUCCH within the one or more collision slots.

14. The terminal according to claim 9, wherein, the starting time further comprises a position of a start symbol.

15. The terminal according to claim 10, wherein, the configuration of at least one of the first PUCCH and the second PUCCH is a configuration of the second PUCCH, and the configuration comprises the format;
  in a case that the format of the second PUCCH is format 0 or format 2, transmitting one of the first PUCCH and the second PUCCH within the one of more collision slots comprises:
    transmitting the second PUCCH within the one or more collision slots;
  delaying the transmission of the other one of the first PUCCH and the second PUCCH or discarding the other one of the first PUCCH and the second PUCCH within the one or more collision slots comprises:
    delaying transmission of the first PUCCH or discarding the first PUCCH within the one or more collision slots.

16. The terminal according to claim 10, wherein, the configuration of at least one of the first PUCCH and the second PUCCH is a configuration of the second PUCCH, and the configuration comprises the transmission mode;
  in a case that the transmission mode of the second PUCCH is single-slot transmission, transmitting one of the first PUCCH and the second PUCCH within the one or more collision slots comprises:
    transmitting the second PUCCH within the one or more collision slots;
  delaying the transmission of the other one of the first PUCCH and the second PUCCH or discarding the other one of the first PUCCH and the second PUCCH within the one or more collision slots comprises:
    delaying transmission of the first PUCCH or discarding the first PUCCH within the one or more collision slots.

* * * * *